US008995023B2

(12) United States Patent
Li et al.

(10) Patent No.: US 8,995,023 B2
(45) Date of Patent: Mar. 31, 2015

(54) AMPLIFICATION MODULATION SCREENING METHOD AND APPARATUS

(75) Inventors: Haifeng Li, Beijing (CN); Bin Yang, Beijing (CN)

(73) Assignees: Peking University Founder Group Co., Ltd, Beijing (CN); Peking University, Beijing (CN); Beijing Founder Electronics Co., Ltd., Beijing (CN); Peking University Founder R & D Center, Beijing (CN)

( * ) Notice: Subject to any disclaimer, the term of this patent is extended or adjusted under 35 U.S.C. 154(b) by 0 days.

(21) Appl. No.: 13/996,907

(22) PCT Filed: Dec. 23, 2011

(86) PCT No.: PCT/CN2011/084554
§ 371 (c)(1),
(2), (4) Date: Sep. 17, 2013

(87) PCT Pub. No.: WO2012/083878
PCT Pub. Date: Jun. 28, 2012

(65) Prior Publication Data
US 2014/0002864 A1    Jan. 2, 2014

(30) Foreign Application Priority Data

Dec. 23, 2010  (CN) .......................... 2010 1 0620430

(51) Int. Cl.
*H04N 1/405* (2006.01)
*G09G 3/20* (2006.01)
*G06T 11/40* (2006.01)

(52) U.S. Cl.
CPC ........... *H04N 1/4058* (2013.01); *H04N 1/4055* (2013.01); *G09G 3/2011* (2013.01); *G06T 11/40* (2013.01); *G09G 2300/0426* (2013.01); *G09G 2300/0443* (2013.01); *G09G 2300/0452* (2013.01)

USPC .......................................................... 358/3.2

(58) Field of Classification Search
CPC ..... H04N 1/4055; H04N 1/4058; H04N 1/52; H04N 1/4051; H04N 1/40062
USPC ............... 358/3.2, 3.17, 3.13, 534, 535, 3.09, 358/3.11, 3.16, 536, 3.03, 3.14; 359/2, 22; 283/86, 93; 430/10
See application file for complete search history.

(56) References Cited

U.S. PATENT DOCUMENTS 6,865,001 B2 *  3/2005  Long et al. ...................... 359/2

FOREIGN PATENT DOCUMENTS

CN          1031614 A       3/1989
JP          2006-217246     8/2006

OTHER PUBLICATIONS

Qiao, Pengjuan et al., New Digital Screening Technology Based on Traditional Textile Printing, Journal of Zhejiang Sci-Tech University, Jan. 2007, vol. 24, No. 1, pp. 15-18.

(Continued)

*Primary Examiner* — Charlotte M Baker
(74) *Attorney, Agent, or Firm* — Lathrop & Gage LLP

(57) ABSTRACT

An amplitude modulation screening method is provided. The method comprises a step of utilizing regular hexagon screen dots to form a threshold matrix for amplitude screening. In embodiments of the present application, an amplitude modulation screening apparatus is also provided. The apparatus may comprise a matrix module configured to constitute a threshold matrix for amplitude screening using regular hexagon screen dots. Due to the threshold matrix formed with regular hexagon screen dots, the method and apparatus of the present application resolve the problem of the screen dots in the prior art, and improve the printing quality.

11 Claims, 4 Drawing Sheets

(56) References Cited

OTHER PUBLICATIONS

Jin, Yang et a., Dot Shape Description with Mathematical Parametric Function and PostScript Language, Journalof Beijing Institute of Graphic Communication, Sep. 2001, vol. 9, No. 3, pp. 3-8.
PCT/CN2011/084554 Written Opinion dated Mar. 29, 2012, 8 pages.
PCT/CN2011/084554 International Search Report dated Mar. 29, 2012, 6 pages.
Zhang, Cheng, Study of Irregular Mesh Form Design and AM FM Screening in RIP Screening, Master Dissertation of Peking University, Dec. 2012, pp. 18-30.

* cited by examiner

AMPLIFICATION MODULATION SCREENING METHOD AND APPARATUS

TECHNICAL FIELD

The present application relates to a printing field, in particular, to an amplitude modulation screening method and an amplitude modulation screening apparatus.

BACKGROUND

Modern offset printing utilizes Kirschner printing, i.e., four-color printing in which a color picture is divided into four colors: cyan (C), magenta (M), yellow (Y) and black (B). For the ink, its color and consistency are invariant, and thus the outputs of the printing are 0 and 1, which, respectively, represent whether the ink exists or not without any middle grayscale. This thus determines that the image to be printed should consist of binary image elements. A process for transferring a grayscale image into a two-value image is called a screening, in which a continuous-tone image is decomposed into screen dots. In the screened image, the actually gradation of the image is embodied by the size and density of screen dots. In the iconography, a process for screening an image is called digital halftone process. If distances between screen dots are constant and sizes thereof are variant, then the process is called amplitude modulation screening; however, if the distances are variant and the sizes are constant, then the process is called frequency modulation screening.

When a printed image is viewed by an amplifying device, it is found that, the microscopic dot-particles with the same color, which can be also seen by the naked eye, are arranged regularly. In some images, the dot-particles are arranged regularly in the center while increase in size as the local grayscale increases, wherein such images are generated using an amplitude modulation screening process and the dot-particles therein with various shapes are called screen dots in the art. In other images, the dot-particles are smaller and have same sizes, and the dot-particles are dense at high grayscale but sparse at low grayscale. Such images are generated by a frequency modulation screening process and the dot-particles therein are also called screen dots that are different from those in the amplitude modulation screen.

The amplitude modulation screen has a screen shape in which the screen dots vary in shape and size as grayscale increases. In addition to purely circular screen dots, the additional screen shape further has linear screen dots, square-circular screen dots, square screen dots, oval screen dots, and diamond screen dots and so on. These screen dots belong to traditional amplitude modulation screen dots.

In the traditional printing, amplitude modulation screen dots are frequently used. In this case, since there is a common phenomenon of screen dots enlargement in the plate printing, the greater screen dots enlarge, the greater the output gradation of printing losses. Since the screen dots enlargements are different in degree, based on geometrical deduction, purely circular screen dots have the smallest perimeter among others, the purely circular screen dots thus will be enlarged less than other regular screen dots. However, if the circular screen dots connect with each other, the coefficient of enlargement will become much higher, which will cause screen dot ink to be accumulated in and around shade-tone area, such that the shade-tone section has no gradation.

The inventor found that, other screen dots in additional to the purely circular screen dots have two typical characteristics belonging to the amplitude modulation screen as follow:

1) individual screen dots have relative larger perimeters compared to the purely circular screen dots;
2) the screen dots are only arranged in two orthogonal angles, θ and 90+θ, respectively.

Meanwhile, the orthogonal angles mentioned in 2) are also common to the traditional screen dots. The inventor found that, based on many practical printing experiences in combination with the geometrical deduction, it can be deduced that the orthogonal arrangement of screen dots trend to cause the CMYK four-color printing to hit a net or produce a problem of texture under the limited angle selection and inappropriate control, which finally affects the output quality of printing.

SUMMARY

In the present application, an amplitude modulation screening method and an amplitude modulation screening apparatus are provided so as to resolve the problem of the screen dots in the prior art.

In an embodiment of the present application, an amplitude modulation screening method is provided. The method may comprise a step of utilizing regular hexagon screen dots to form a threshold matrix for amplitude screening.

In an embodiment of the present application, an amplitude modulation screening apparatus is provided. The apparatus may comprise a matrix module configured to utilize regular hexagon screen dots to form a threshold matrix for amplitude screening.

Due to the threshold matrix formed with regular hexagon screen dots, the proposed method and apparatus in the above embodiments of the present application resolve the problem of the screen dots in the prior art, and improve the printing quality.

BRIEF DESCRIPTION OF THE DRAWING

The accompany drawings illustrated herein provide further understanding of the present application, constituting a part of the present application. The schematic embodiments and the illustrations thereof trend to interpret the present invention without limiting the present invention inappropriately.

DETAILED DESCRIPTION

Hereafter, the present application is illustrated in detail with reference to the accompany drawings in combination with embodiments.

In an embodiment of the present application, an amplitude modulation screening method is provided and comprises a step of utilizing regular hexagon screen dots to form a threshold matrix for amplitude modulation screening.

Figure 1:
FIG. 1 is a schematic diagram showing size variation pattern of hexagon screen dots according to an embodiment of the present application.

In the prior art, the purely circular screen dots, linear screen dots, square-circular screen dots, square screen dots, oval screen dots and diamond screen dots and so on are provided, they, however, have respective problems. FIG. 1 is a schematic diagram showing size variance pattern of hexagon screen dots according to an embodiment of the present application. As shown in FIG. 1, the generated regular hexagon screen dots effectively decrease perimeters of individual screen dots, such that the perimeters of the regular hexagon screen dots are much closer to those of the purely circular screen dots. In this way, the screen dots enlargements are reduced and controlled in an allowable range. Meanwhile, due to the non-orthogonal angle arrangements of the hexagon screen dots, a texture problem, such as net hitting, caused by overprinting and traditional screen angle limitation is prevented, and thus the screen dots not only are capable of being used in any printing condition, but also improve the gradation quality of screen dots.

Figure 2:
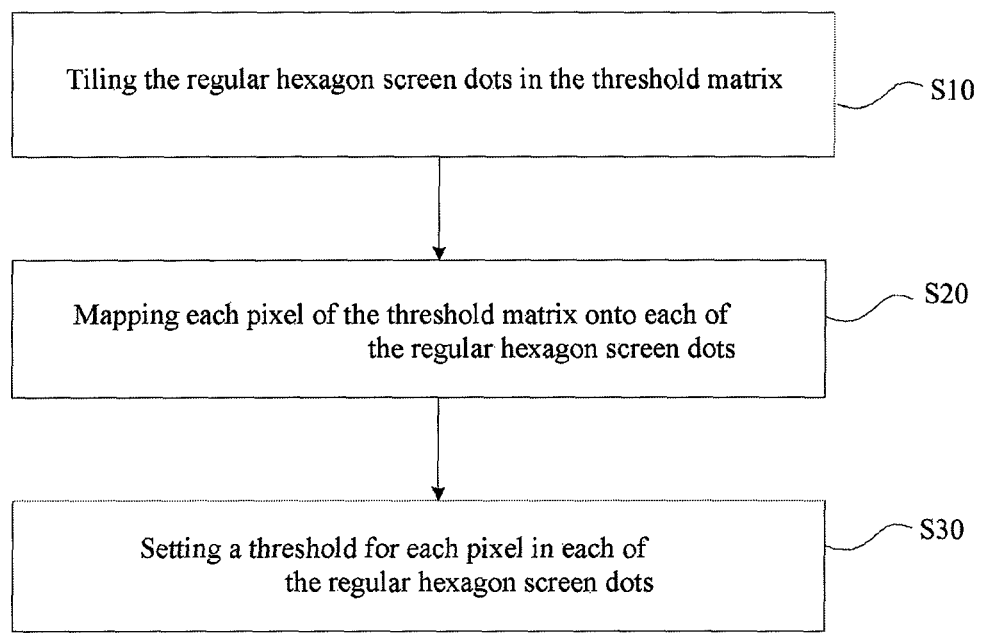
FIG. 2 is a flow chart showing a process of forming a threshold matrix with regular hexagon screen dots according to a preferable embodiment of the present application.

FIG. 2 is a flow chart showing a process of forming a threshold matrix with hexagon screen dots according to a preferable embodiment of the present application. The process comprises:

a step S10 of tiling the regular hexagon screen dots in a threshold matrix;

a step S20 of mapping each pixel of the threshold matrix onto each of the regular hexagon screen dots; and a step S30 of setting a threshold for each pixel in each of the regular hexagon screen dots.

Figure 3:
FIGS. 3 to 5 are schematic diagrams for tiling regular hexagon screen dots in the threshold matrix according to a preferable embodiment of the present application.
Figure 4:
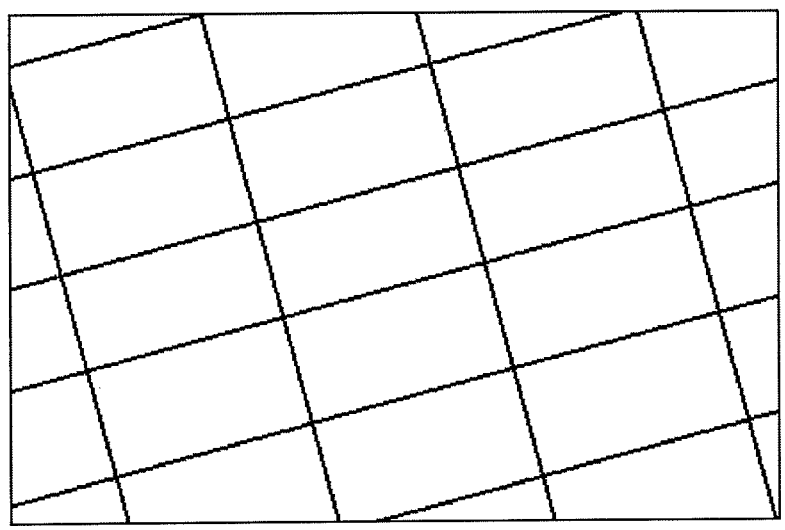
Figure 5:
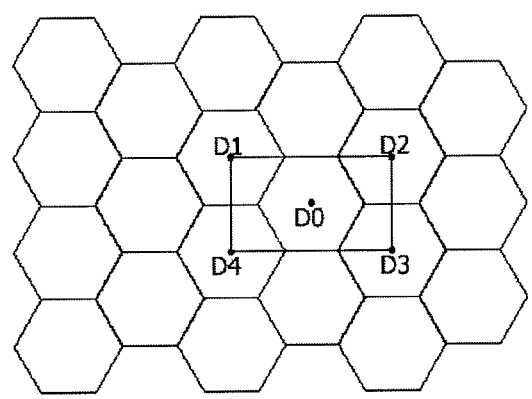

FIGS. 3 to 5 are schematic diagrams of tiling the regular hexagon screen dots in the threshold matrix according to a preferable embodiment of the present application. FIG. 3 is a created characteristic matrix. FIG. 4 is a diagram of dividing the threshold matrix into a plurality of tiled characteristic rectangles. As shown in FIG. 5, each characteristic rectangle comprises: one hexagon screen dot D0 in the center of the characteristic rectangle; and four ¼ hexagon screen dots D1, D2, D3 and D4 located at four corners of the characteristic rectangle, respectively and being adjacent to D0, wherein the regular hexagon screen dot is cut into four portions, through using a diagonal line along the tiling direction as a first cutting line and using a line passing through the center of the hexagon screen dot and being perpendicular to the first cutting line as a second cutting line.

Compared to the square screen dots, the regular hexagon screen dots cannot be tiled in the threshold matrix due to the geometric characteristic of the regular hexagon, so a rectangle screen dot area T' is defined as shown in FIG. 3, i.e., the characteristic rectangle. As shown in FIG. 4, the tiling in the threshold matrix is performed using the characteristic rectangle T'. After that, as shown in FIG. 5, the regular hexagon is divided in each characteristic rectangle T' so as to achieve the effect of tiling the regular hexagon screen dots in the threshold matrix. Tiling the regular hexagon screen dots by using characteristic rectangle is just a preferable embodiment of the present application. The present application is not limited hereto, and any geometric method for tiling the regular screen dots in the threshold matrix may be selected under the spirit and scope of the present application.

Preferably, the step of dividing the threshold matrix into a plurality of tiled characteristic matrixes comprises:

1) a step of setting coprime length p and width q of the characteristic rectangle, wherein $p/q \approx \sqrt{3}:1$;

2) a step of setting the tiling direction $\theta$, wherein $tg\theta = a/b$ and a and b are coprime;

3) a step of setting the length X and width Y and the threshold matrix, wherein $$X = \text{Min}\left\{\text{int}\left(\frac{q \times res}{freq} \times \frac{\sqrt{a^2+b^2}}{\langle a \times p, b \times q \rangle}\right), \text{int}\left(\frac{p \times res}{freq} \times \frac{\sqrt{a^2+b^2}}{\langle a \times p, b \times q \rangle}\right)\right\}$$

$$Y = \text{Min}\left\{\text{int}\left(\frac{q \times res}{freq} \times \frac{\sqrt{a^2+b^2}}{\langle a \times q, b \times p \rangle}\right), \text{int}\left(\frac{p \times res}{freq} \times \frac{\sqrt{a^2+b^2}}{\langle a \times q, b \times p \rangle}\right)\right\}$$

where Min{,} indicates a minimized operation, <,> indicates the greatest common divisor operation, the sign int( ) indicates a rounding operation, Res indicates a resolution of the printing device, and freq is the number of screening lines; and 4) a step of determining the number n of the regular hexagon screen dots:

$$n = X \times Y / \left(\frac{res}{freq} \times \frac{res}{freq}\right) = \frac{p \times q \times (a^2+b^2)}{\langle a \times p, b \times q \rangle \times \langle a \times q, b \times p \rangle}.$$

The above preferable embodiment shows a description of function of examples in FIGS. 3 to 5, which may be simply performed by a computer.

Preferably, set p=7, q=4, a=7 and b=26. These parameters are relatively small, but can satisfy the above-mentioned coprime and ratio requirements, such that the calculation amount of the computer can be reduced and the screening rate is accelerated. For an example, when Res=2400 dpi and freq=175, it can be calculated that X=106, Y=1477 and n=1450 based on the above parameters.

Figure 6:
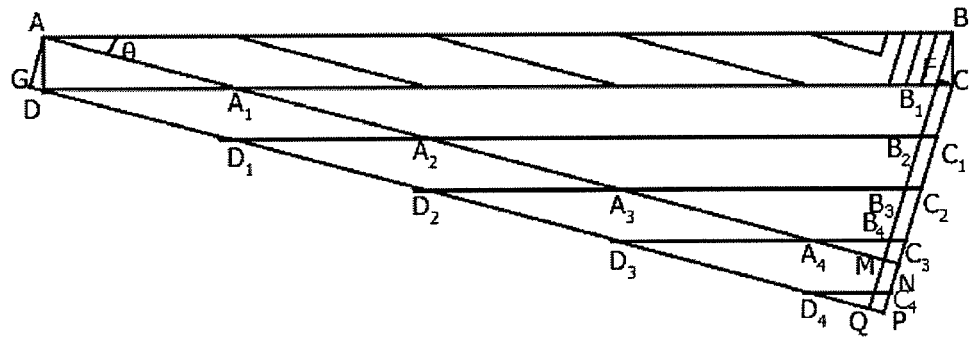
FIG. 6 is a schematic diagram showing geometric transformation of mapping the threshold matrix according to a preferable embodiment of the present application.

FIG. 6 is a schematic diagram showing geometric transformation of mapping the threshold matrix according to a preferable embodiment of the present application. The steps of mapping each pixel onto each of the regular hexagon screen dots will be discussed as below.

A line AA1 which has a interaction angle with a line AB along the tiling direction, and interacts with a line CD at a point A1 is drawn, and a line BB1 which is perpendicular to the line AA1 and interacts with a line CD at a point B1 is drawn; and a line segment CF which is perpendicular to the line BB1 and interacts with the line BB1 at a point F is also drawn. And then a right triangle BFC is horizontally translated to the left X to obtain AGD, a trapezoid ABB1A1 is vertically translated downwards Y−1 pixels to form a new trapezoid DCC1D1, AA1 is extended to interact with D1C1 at a point A2; BB1 is extended to interact with D1C1 at a point B2; a trapezoid A1B1B2A2 is vertically translated downwards Y pixels to form a new trapezoid D1C1C2D2. The above operations will be repeated until the lines AA1 and BB1 interact at a point M in a new trapezoid D3C3C4D4. And then a right triangle A4MB4 will be vertically translated downwards Y pixels to obtain D4PC4, the line AA1 is extended to interact with CP at a point N, and the line BB1 is extended to interact with DP at a point Q, wherein a rectangle AMQG and a rectangle CFQP form a L-shaped area.

The screen dots in the L-shaped area are uniquely numbered s, such as 0-1449.

The L-shaped area is projected onto the rectangle ABCD, that is, it projects the L-shaped area onto the rectangle ABCD to obtain an area division of the rectangle ABCD. The area division corresponds to respective portion of the L-shaped area, and the screen dots therein remain their numbers. Thus, in the whole rectangle ABCD, whether the complete screen dots or incomplete screen dots have uniform numbers, in which incomplete screen dots with the same numbers may be combined into a complete screen dot. To this point, each of the screen dots in the threshold matrix was uniformly numbered, such that each pixel in the threshold matrix T was mapped onto respective regular hexagon screen dot through the geometric transformation. So-called "projection/projecting" means: the lines extending from apexes of an area and perpendicular to the projected area are made, and the connection lines of the intersection points of the perpendicular lines with the projected area will form a projected area.

Preferably, for each of the regular hexagon screen dots, the step of setting the threshold for each pixel in each of the regular hexagon screen dots comprises: for each of the regular hexagon screen dots, determining the sorting value $f_i$ of each pixel based on the location of the pixel in the regular hexagon screen dot, where $i=1, 2, \ldots, X \times Y/n$, X and Y represent the length and width of the threshold matrix and n is the number of the hexagon screen dots. An array as follow is established based on the sorting value:

$$A = \begin{cases} A_0[f_1, f_2, \ldots f_{(X \times Y/n)}] \\ A_1[f_1, f_2, \ldots f_{(X \times Y/n)}] \\ \ldots \\ A_i[f_1, f_2, \ldots f_{(X \times Y/n)}] \\ \ldots \\ A_n[f_1, f_2, \ldots f_{(X \times Y/n)}] \end{cases} \ldots (f_1 < f_2 < \ldots < f_{(X \times Y/n)})$$

where $A_i$ corresponds to each of the regular hexagon screen dots.

Preferably, for each of the regular hexagon screen dots, the step of determining the sorting value $f_i$ of each pixel based on the location of the pixel in the regular hexagon screen dot comprises:

setting $f_i$ to be $$\begin{cases} f_i = (2 \times y_i)/q, \text{ if } k <= 0 \\ f_i = 3 \times x_i / p + y_i / q, \text{ if } k > 0. \end{cases}$$

where $k = 3 \times q \times x_i - p \times y_i$, $x_i$, $y_i$ represent coordinates of pixel i in the regular hexagon screen dot. For each of the regular hexagon screen dots, the center thereof is considered as the origin, and the diagonal line along the tiling direction is considered as the horizontal axis, and the line passing through the center of the regular hexagon screen dot and being perpendicular to the horizontal axis is considered as the vertical axis, so a coordinate system for each of the regular hexagon screen dots is created, and then coordinates $x_i$, $y_i$ of the pixel in each of the regular pixel screen dots are determined in the coordinate system.

Preferably, for each of the regular hexagon screen dots, the threshold of each pixel is set therein as follow:

$$A = \begin{cases} A_0[1, 2, 3, \ldots, j, \ldots, X \times Y/n] \\ A_1[1, 2, 3, \ldots, j, \ldots, X \times Y/n] \\ \ldots \\ A_i[1, 2, 3, \ldots, j, \ldots, X \times Y/n] \\ \ldots \\ A_{n-1}[1, 2, 3, \ldots, j, \ldots, X \times Y/n]. \end{cases}$$

where $A_i[1,2,3,\ldots,j,\ldots,X \times Y/n]$ can also be represented as $A_i[j]=j$, $i \in [0,n-1]$ and $j \in [0, X \times Y/n-1]$.

Preferably, the method further comprises a step of generating random jitter table D[i], and a step of setting $A_i[j] = D[i]*n+D[j]$, where $i \in [0,n-1]$, $i \in [0,n-1]$, $j \in [0,X \times Y/n-1]$.

In the preferable embodiment, a threshold jitter is performed according to the threshold in each array, such that the thresholds for each two points in the threshold rectangle are different. Thereafter, an example of generating the random jitter table D[i] by a computer comprises the following steps 1)-3) as blow.

In step 1), the random jitter table D[i] is firstly generated, wherein $i \in [0,n-1]$, comprising:

a) providing an initial seed z=1;
b) calculating a first data D[0] as D[0] = z & 255
c) recalculating the initial seed z, which may be performed in C code:
   For(i=0 ; i < 8 ; i ++){
       d = (z & 268435456)>>28
       h = (z & 67108864)>>26
       z = ((z<<1)& 536870910 )|((d ^ h)& 1)
   }
d) repeating steps b) to d) to calculate other values in D successively: D[0], D[1],..., D[i],..., D[n-1], D[i] ∈ [0,n − 1].

In Step 2), it performs a threshold substitution jitter on each screen dots array A in the threshold matrix T according to the jitter table:

$$A_i[j]=D[i]*n+D[j]$$

where i indicates an index of the screen dots array A, $i \in [0,n-1]$ and n=1450, and j indicates an index of a pixel in a screen dots array $A_i$, $j \in [0,n-1]$;

In step 3), it assigns a threshold to each pixel in each screen dots array $A_i$ by coordinates (x, y) after the above jitter, such that the threshold matrix T is finally generated.

Figure 7:
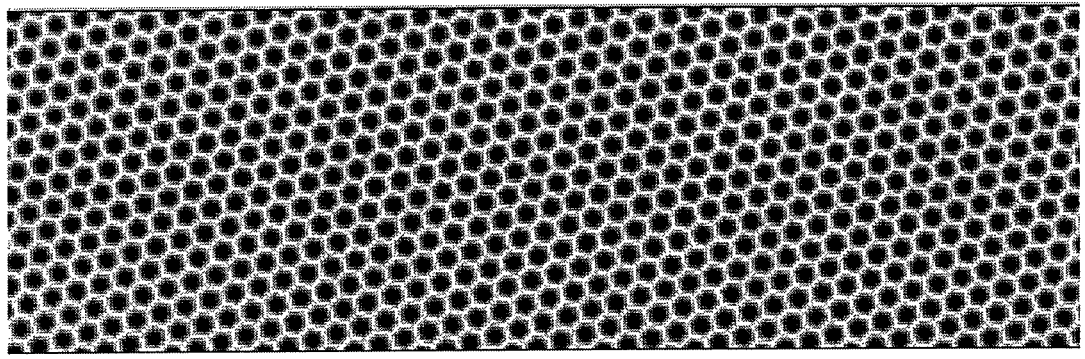
FIG. 7 is a diagram showing tiling effects of hexagon screen dots with different width and height generated according to a preferable embodiment of the present application.
Figure 8:
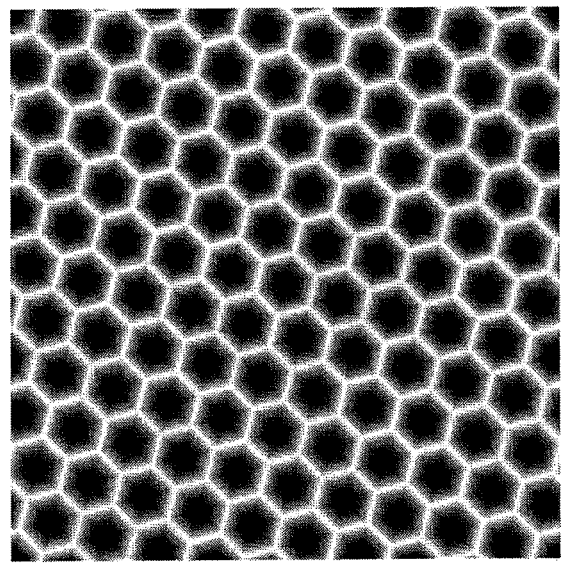
FIG. 8 is a diagram showing tiling effects of hexagon screen dots with same width and height generated according to a preferable embodiment of the present application.

The effect of tiling the hexagon screen dots according to the above preferable embodiment is shown in FIG. 7, while the enlarging effect of tiling the hexagon screen dots with equal length and width is shown in FIG. 8.

In an embodiment of the present application, there is provided with an amplitude modulation screening apparatus comprising a matrix module configured to utilize regular hexagon screen dots to constitute a threshold matrix for amplitude screening. The apparatus may improve the printing quality.

Figure 9:
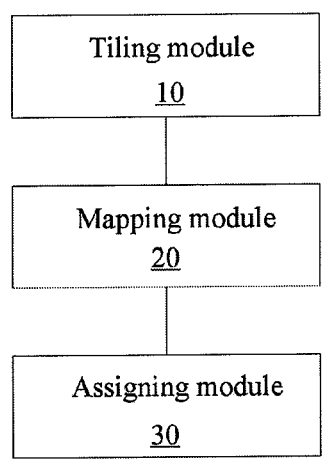
FIG. 9 is a schematic diagram showing a matrix module according to a preferable embodiment of the present application.

FIG. 9 is a schematic diagram showing a matrix module according to a preferable embodiment of the present application. The matrix module comprises a tiling module 10 configured to tile the regular hexagon screen dots in a threshold matrix; a mapping module 20 configured to map each pixel of the threshold matrix onto each of the regular hexagon screen dots; and an assigning module 30 configured to set a threshold for each pixel in each of the regular hexagon screen dots.

Preferably, the tiling module 10 comprises a dividing module configured to divide the threshold matrix into a plurality of tiled characteristic rectangles; and a creating module configured to set each characteristic rectangle to comprise: one regular hexagon screen dot D0 at the center; and four ¼ hexagon screen dot D1, D2, D3 and D4 at the corners of the characteristic rectangle, respectively and being adjacent to D0. A regular hexagon screen dot is divided into four portions, through using the diagonal line along the tiling direction as a first cutting line and using a line passing through the center of the regular hexagon screen dot and being perpendicular to the first cutting line as a second cutting line.

As seen from the above description, in the above embodiment, based on the traditional method for generating different screen shape threshold matrix, according to the technological requirements of traditional printing and special printings (such as a flexography, a intaglio printing, or a screen printing), by using geometry and mathematical deduction formula and so on, the generated regular hexagon screen dot effectively reduces the perimeter of a single screen dot so as to approach the perimeter of the purely circular screen dot. This effectively reduces the screen dot enlargement effect and limits the perimeter thereof within an allowable range. Meanwhile, due to the non-orthogonal arrangement of the regular hexagon screen dot, a texture problem, such as net hitting, caused by overprinting and traditional screen angle limitation is prevented, and thus the screen dots not only are capable of being used in any printing condition, but also improve massively the layering quality of screen dots.

Apparently, it shall be understood by those skilled in the art that the above-mentioned each module or step of the application can be performed by a general computing device, which may be integrated in a single computing device. Alternatively, they may be performed by programmable code/instructions executable by the computing device, and thus can be stored in a memory so as to be executable by the computing device. Or, they can be made into respective integrated circuit modules. Alternatively, a plurality of modules or steps can be manufactured into a single integrated circuit module. In this way, the present invention is not limited to any combination of specific hardware and software.

The above description is only preferable embodiments of the present application, and does not tend to limit the present invention. It will be apparent to those skilled in the art from consideration of the specification and practice of the present disclosure that various modifications and variations can be made to the disclosed systems and methods without departing from the scope of the disclosure, as claimed.

The invention claimed is:

1. An amplitude modulation screening method, comprising:
utilizing regular hexagon screen dots to form a threshold matrix for amplitude screening, the step of utilizing comprising:
tiling the regular hexagon screen dots in the formed threshold matrix;
mapping each pixel of the threshold matrix onto each of the regular hexagon screen dots; and
setting a threshold for each pixel in each of the regular hexagon screen dots.

2. The method of claim 1, wherein the step of tiling comprises:
dividing the threshold matrix into a plurality of tiled characteristic rectangles;
setting each of the characteristic rectangles to include:
one said regular hexagon screen dot D0 at the center of the characteristic rectangle; and
four ¼ said regular hexagon screen dots D1, D2, D3, D4 at corners of the characteristic rectangle, respectively, and being adjacent to D0, wherein the regular hexagon screen dot is divided into four portions in accordance with:
a first cutting line, which is a diagonal line along the tiling direction, and
a second cutting line, which passes through a center of the regular hexagon screen dot and being perpendicular to the first cutting line.

3. The method of claim 2, wherein the step of mapping comprises:
drawing a line AA1 which has an interaction angle with a line AB along the tiling direction and interacts with a line CD at a point A1,
drawing a line BB1 which is perpendicular to the line AA1 and interacts with the line CD at a point B1,
drawing a line segment CF which is perpendicular to the line BB1 and interacts with the line BB1 at a point F,
translating horizontally a right triangle BFC to the left X to obtain AGD,
translating vertically a trapezoid ABB1A1 downwards Y−1 pixels to form a new trapezoid DCC1D1,
extending AA1 to interact with D1C1 at a point A2, and BB1 to interact with D1C1 at a point B2,
translating vertically a trapezoid A1B1B2A2 downwards Y pixels to form a new trapezoid D1C1C2D2,
repeating the above operations until the lines AA1 and BB1 interact at a point M in a new trapezoid D3C3C4D4,
translating vertically a right triangle A4MB4 downwards Y pixels to obtain D4PC4,
extending the line AA1 to interact with CP at a point N,
extending the line BB1 to interact with DP at a point Q,
wherein a rectangle AMQG and a rectangle CFQP form a L-shaped area;
numbering uniquely screen dots in the L-shaped area; and
projecting the L-shaped area onto the rectangle ABCD.

4. The method of claim 2, wherein the step of dividing the threshold matrix into a plurality of tiled characteristic rectangles comprises:
setting coprime length p and width q of the characteristic rectangle, where $p/q \approx \sqrt{3}:1$;
setting the tiling direction θ, wherein $tg\theta = a/b$, and a and b are coprime;
setting a length and a width of the threshold matrix as follows:

$$X = \text{Min}\left\{ \text{int}\left( \frac{q \times res}{freq} \times \frac{\sqrt{a^2+b^2}}{\langle a \times p, b \times q \rangle} \right), \text{int}\left( \frac{p \times res}{freq} \times \frac{\sqrt{a^2+b^2}}{\langle a \times p, b \times q \rangle} \right) \right\}$$

$$Y = \text{Min}\left\{ \text{int}\left( \frac{q \times res}{freq} \times \frac{\sqrt{a^2+b^2}}{\langle a \times q, b \times p \rangle} \right), \text{int}\left( \frac{p \times res}{freq} \times \frac{\sqrt{a^2+b^2}}{\langle a \times q, b \times p \rangle} \right) \right\}$$

where Min{,} represents a minimized operation, <,> represents the greatest common divisor operation, the sign int( ) represents a rounding operation, Res represents a resolution of the printing device, and freq is the number of screening lines;
determining the number n of the regular hexagon screen dot as:

$$n = X \times Y \Big/ \left( \frac{res}{freq} \times \frac{res}{freq} \right) = \frac{p \times q \times (a^2+b^2)}{\langle a \times p, b \times q \rangle \times \langle a \times q, b \times p \rangle}.$$

5. The method of claim 4, wherein set p=7, q=4, a=7, b=26.

6. The method of claim 2, wherein the step of setting a threshold for each pixel comprises:

for each of the regular hexagon screen dots, determining a sorting value $f_i$ for each pixel based on a location of the pixel in the regular hexagon screen dot, wherein i=1, 2, . . . X×Y/n, X and Y represent the length and the width of the threshold matrix, respectively, and n represents the number of the hexagon screen dots;

establishing an array A based on the sorting value by rule of:

$$A = \begin{cases} A_0[f_1, f_2, \ldots f_{(X \times Y/n)}] \\ A_1[f_1, f_2, \ldots f_{(X \times Y/n)}] \\ \ldots \\ A_i[f_1, f_2, \ldots f_{(X \times Y/n)}] \\ \ldots \\ A_n[f_1, f_2, \ldots f_{(X \times Y/n)}] \end{cases} \ldots (f_1 < f_2 < \ldots < f_{(X \times Y/n)})$$

where $A_i$ corresponds to each of the regular hexagon screen dots.

7. The method of claim 6, wherein the step of determining the sorting value $f_i$ for each pixel comprises:

setting $f_i$ to be $$\begin{cases} f_i = (2 \times y_i)/q, \text{ if } k <= 0 \\ f_i = 3 \times x_i/p + y_i/q, \text{ if } k > 0; \end{cases}$$

where $k = 3 \times q \times x_i - p \times y_i$, $x_i$, $y_i$ represent coordinates of pixel i in the regular hexagon screen dot, wherein, for each of the regular hexagon screen dots, the center thereof is considered as the origin, and a diagonal line along the tiling direction is considered as the horizontal axis, and a line passing through the center of the regular hexagon screen dot and being perpendicular to the horizontal axis is considered as the vertical axis, so a coordinate system for each of the regular hexagon screen dots is created, and coordinates $x_i$, $y_i$ of the pixel in each regular pixel screen dot are determined in the coordinate system.

8. The method of claim 7, wherein for each of the regular hexagon screen dots, set the threshold of each pixel therein to be:

$$A = \begin{cases} A_0[1, 2, 3, \ldots, j, \ldots, X \times Y/n] \\ A_1[1, 2, 3, \ldots, j, \ldots, X \times Y/n] \\ \ldots \\ A_i[1, 2, 3, \ldots, j, \ldots, X \times Y/n] \\ \ldots \\ A_{n-1}[1, 2, 3, \ldots, j, \ldots, X \times Y/n] \end{cases}$$

where, i∈[0,n−1] and j∈[0,X×Y/n−1].

9. The method of claim 8, wherein the method further comprises:

generating random jitter table D[i], where i∈[0,n−1]; and setting $A_i[j]$=D[i]*n+D[j], i∈[0,n−1], j∈[0,X×Y/n−1].

10. An amplitude modulation screening apparatus, comprising:

a matrix module configured to use regular hexagon screen dots to form a threshold matrix for amplitude screening, the matrix module comprising:

a tiling module configured to tile the regular hexagon screen dots in a threshold matrix;

a mapping module configured to map each pixel of the threshold matrix onto each of the regular hexagon screen dots; and an assigning module configured to set a threshold for each pixel in each of the regular hexagon screen dots.

11. The apparatus of claim 10, wherein the tiling module comprises:

a dividing module configured to divide the threshold matrix into a plurality of tiled characteristic rectangles; and a creating module configured to set each characteristic rectangle to comprise:

one regular hexagon screen dot D0 at the center of the characteristic rectangle; and four ¼ said regular hexagon screen dots D1, D2, D3, D4 at corners of the characteristic rectangle, respectively, and being adjacent to D0, wherein the regular hexagon screen dot is divided into four portions in accordance with, a first cutting line, which is a diagonal line along the tiling direction, and a second cutting line, which passes through a center of the regular hexagon screen dot and being perpendicular to the first cutting line.

* * * * *